United States Patent
Toji

(10) Patent No.: US 12,033,371 B2
(45) Date of Patent: Jul. 9, 2024

(54) OBJECT DETECTION DEVICE, OBJECT DETECTION SYSTEM, OBJECT DETECTION METHOD, PROGRAM, AND RECORDING MEDIUM

(71) Applicant: Konica Minolta, Inc., Tokyo (JP)

(72) Inventor: Bumpei Toji, Hashima (JP)

(73) Assignee: Konica Minolta, Inc., Tokyo (JP)

( * ) Notice: Subject to any disclaimer, the term of this patent is extended or adjusted under 35 U.S.C. 154(b) by 333 days.

(21) Appl. No.: 17/605,471

(22) PCT Filed: Apr. 15, 2020

(86) PCT No.: PCT/JP2020/016569
§ 371 (c)(1),
(2) Date: Oct. 21, 2021

(87) PCT Pub. No.: WO2020/235268
PCT Pub. Date: Nov. 26, 2020

(65) Prior Publication Data
US 2022/0215648 A1     Jul. 7, 2022

(30) Foreign Application Priority Data

May 23, 2019   (JP) ................................ 2019-096590

(51) Int. Cl.
*G06V 10/764* (2022.01)
*G06T 7/70* (2017.01)
(Continued)

(52) U.S. Cl.
CPC .............. *G06V 10/764* (2022.01); *G06T 7/70* (2017.01); *G06V 10/82* (2022.01); *G06V 20/64* (2022.01)

(58) Field of Classification Search
CPC ...... G06V 10/764; G06V 20/64; G06V 10/82; G06T 7/70
See application file for complete search history.

(56) References Cited

U.S. PATENT DOCUMENTS 8,311,272 B2 * 11/2012 Matsugu .............. G06V 40/165
382/103
9,152,886 B2 * 10/2015 Sakai ................... G06V 40/103
(Continued)

FOREIGN PATENT DOCUMENTS

JP       2011-138387 A      7/2011
JP       2013-12163 A       1/2013
(Continued)

OTHER PUBLICATIONS

Japanese Office Action (JPOA) issued on Aug. 8, 2023 and issued in Japanese Patent Application No. 2021-520655 and its English machine translation.
(Continued)

*Primary Examiner* — Gregory M Desire
(74) *Attorney, Agent, or Firm* — RANKIN, HILL & CLARK LLP

(57) ABSTRACT

An object position area detection unit of an object detection device detects a position area of an object included in an inputted image, on the basis of a first class definition in which a plurality of classes are defined in advance. A class identification unit identifies which of the plurality of classes the object belongs to, on the basis of a second class definition in which a plurality of classes are defined in advance. An object detection result output unit outputs an object detection result on the basis of a detection result of the object position area detection unit and an identification result of the class identification unit. The number of classes defined by the second class definition is smaller than the number of classes defined by the first class definition. The plurality of classes defined by the second class definition are formed by collecting some of a plurality of classes defined by the first class definition.

13 Claims, 4 Drawing Sheets

(51) Int. Cl.
*G06V 10/82* (2022.01)
*G06V 20/64* (2022.01)

(56) References Cited

U.S. PATENT DOCUMENTS

| | | | |
|---|---|---|---|
| 10,353,950 B2* | 7/2019 | Sharma | G06V 10/764 |
| 10,586,115 B2* | 3/2020 | Nakasu | G06V 40/16 |
| 10,762,662 B2* | 9/2020 | Chalamala | G06F 18/211 |
| 11,087,130 B2* | 8/2021 | Liu | G06F 18/21 |
| 11,100,325 B2* | 8/2021 | Xu | G06F 18/241 |
| 11,113,840 B2* | 9/2021 | Ye | G06F 18/2415 |
| 2017/0124415 A1 | 5/2017 | Choi et al. | |

FOREIGN PATENT DOCUMENTS

| | | |
|---|---|---|
| JP | 2018-513491 A | 5/2018 |
| JP | 2018-526723 A | 9/2018 |
| JP | 2019-16298 A | 1/2019 |
| JP | 2019-32773 A | 2/2019 |
| JP | 2019032773 A | 2/2019 |
| JP | 2019-36167 A | 3/2019 |
| JP | 2019-49604 A | 3/2019 |
| JP | 2019036167 A | 3/2019 |
| JP | 2019049604 A | 3/2019 |
| WO | 2015/147333 A1 | 10/2015 |
| WO | 2015147333 A1 | 10/2015 |

OTHER PUBLICATIONS

Extended European Search Report (EESR) dated Jun. 17, 2022 for European Patent Application No. 20808896.3.
Xiang et al., "Subcategory-Aware Convolutional Neural Networks for Object Proposals and Detection", 2017 IEEE Winter Conference on Applications of Computer Vision, Computer Society, 2017, pp. 924-933; Cited in EESR.
International Search Report (ISR) dated Jul. 14, 2020 filed in PCT/JP2020/016569 and its English translation.
PCT Written Opinion of the International Searching Authority dated Jul. 14, 2020 filed in PCT/JP2020/016569 and its English translation.

* cited by examiner

OBJECT DETECTION DEVICE, OBJECT DETECTION SYSTEM, OBJECT DETECTION METHOD, PROGRAM, AND RECORDING MEDIUM

TECHNICAL FIELD

The present invention relates to an object detection device, an object detection system, an object detection method, a program, and a recording medium that detect, from an inputted image, an object included in the image.

BACKGROUND ART

Conventionally, a technique for detecting an object included in an inputted image has been developed. Object detection is an important technique for implementing a function as an eye of a robot. Research on object detection has been performed from object detection in which a detection target is specified, such as detecting a face or detecting a person from an image. In recent years, a technique for detecting an object by using machine learning or deep learning has also been proposed (see, for example, Patent Literatures 1 to 5).

CITATION LIST

Patent Literature

Patent Literature 1: JP 2019-16298 A
Patent Literature 2: JP 2013-12163 A
Patent Literature 3: JP 2011-138387 A
Patent Literature 4: JP 2018-526723 A
Patent Literature 5: JP 2018-513491 A

SUMMARY OF INVENTION

Technical Problem

Meanwhile, in a case where machine learning is used, by causing learning in advance by an object position area detection unit that detects a position area of an object included in an image and a class identification unit that identifies a class (type) of the object with use of various types (a large number of classes) of data, it is possible to detect a large number of classes of objects at a time of inference. However, when both the detection of the position area and the identification of the class are performed in a large number of classes, there is a problem that identification performance of a specific class is deteriorated.

For example, an application is assumed in which, as an object, only six classes of a person, a car, a truck, a bus, a bicycle, and a motorcycle are to be identification target. In such an application, in order to enable both detection of a position area of an object and identification of a class for the 80 classes, it is necessary for the class identification unit to perform learning for identifying 80 classes, although only six classes are the identification target. In this case, when a scale (processing capacity) of the class identification unit is constant, identification performance of the class identification unit is also allocated for 74 classes in addition to the six classes of the identification target. As a result, the identification performance on the identification target (six classes) is deteriorated.

Whereas, when both the learning of the object position area detection unit and the learning of the class identification unit are performed using data of six classes in order to avoid deterioration in the identification performance on the identification target, by the object position area detection unit and the class identification unit learning only features of the limited six classes, over-learning is likely to occur, and generalization performance is likely to deteriorate. For example, an object of another class having a feature similar to the identification target class is likely to be erroneously detected (for example, a "train" included in the image may be detected as a "bus"). Such deterioration in the generalization performance leads to deterioration in object detection performance.

Therefore, there is a need for a technique of avoiding deterioration in identification performance for a specific class and avoiding deterioration in object detection performance due to deterioration in generalization performance. However, such a technique has not yet been proposed, including Patent Literatures 1 to 5.

The present invention has been made to solve the above problems, and an object is to provide an object detection device, an object detection system, an object detection method, a program, and a recording medium that can improve identification performance for a specific class and can improve generalization performance to improve object detection performance.

Solution to Problem

An object detection device according to one aspect of the present invention includes: an object position area detection unit that detects, from an inputted image, a position area of an object included in the image, based on a first class definition in which a plurality of classes are defined in advance; a class identification unit that identifies which of the plurality of classes the object belongs to, based on a second class definition in which a plurality of classes are defined in advance; and an object detection result output unit that outputs a detection result of the object, based on a detection result of the object position area detection unit and an identification result of the class identification unit. A number of classes defined by the second class definition is smaller than a number of classes defined by the first class definition, and a plurality of classes defined by the second class definition are formed by collecting some of a plurality of classes defined by the first class definition.

An object detection system according to another aspect of the present invention includes the object detection device and an imaging unit that acquires the image inputted to the object detection device.

An object detection method according to still another aspect of the present invention includes: an object position area detection step of detecting, from an inputted image, a position area of an object included in the image, based on a first class definition in which a plurality of classes are defined in advance; a class identification step of identifying which of the plurality of classes the object belongs to, based on a second class definition in which a plurality of classes are defined in advance; and an object detection result output step of outputting a detection result of the object, based on a detection result of the object position area detection unit and an identification result of the class identification unit. A number of classes defined by the second class definition is smaller than a number of classes defined by the first class definition, and a plurality of classes defined by the second class definition are formed by collecting some of a plurality of classes defined by the first class definition.

A program according to still another aspect of the present invention is a program for causing a computer to execute the object detection method.

A recording medium according to still another aspect of the present invention is a computer-readable recording medium in which the program is recorded.

Advantageous Effects of Invention

Since the number of classes defined by the first class definition is relatively greater than the number of classes defined by the second class definition, detection of the position area of the object in the image can be performed for a large number of classes on the basis of the first class definition. This can improve generalization performance to improve object detection performance. In addition, with regard to class identification, identification can be performed with a small number of specific classes on the basis of the second class definition, and identification of other classes can be made unnecessary. Therefore, identification performance for a small number of specific classes can be improved.

DESCRIPTION OF EMBODIMENTS

An embodiment of the present invention when described with reference to the drawings is as follows.

1. Configuration of Object Detection System

Figure 1:
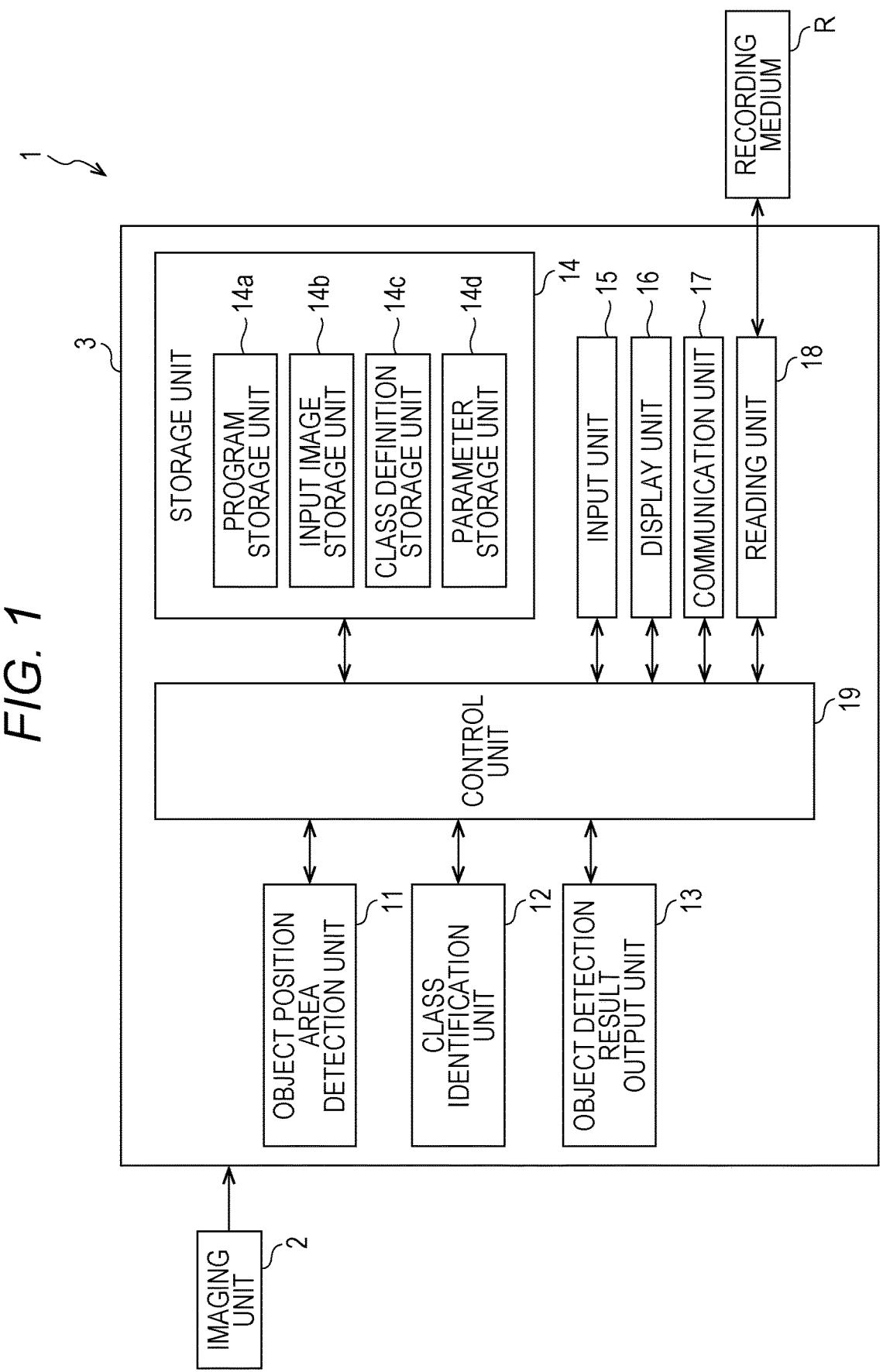
FIG. 1 is a block diagram schematically illustrating an entire configuration of an object detection system according to an embodiment of the present invention.

FIG. 1 is a block diagram schematically illustrating an entire configuration of an object detection system 1 according to the present embodiment. The object detection system 1 is configured to include an imaging unit 2 and an object detection device 3. The imaging unit 2 is configured with a camera that captures an object to acquire an image. The image is, for example, a moving image, but may be a still image. A number of the imaging units 2 included in the object detection system 1 is not particularly limited, and may be one piece or a plurality of pieces.

The imaging unit 2 is communicably connected to the object detection device 3 via a communication line such as a wired cable or a local area network (LAN). Note that the imaging unit 2 may be configured to be able to wirelessly communicate with the object detection device 3. In any case, data of the image acquired by capturing with the imaging unit 2 is sent to the object detection device 3 via the communication line.

The object detection device 3 is configured with, for example, a personal computer (PC). The object detection device 3 includes an object position area detection unit 11, a class identification unit 12, an object detection result output unit 13, a storage unit 14, an input unit 15, a display unit 16, a communication unit 17, a reading unit 18, and a control unit 19. The control unit 19 is configured with a central processing unit (CPU) that controls operation of each unit of the object detection device 3, and operates in accordance with an operation program stored in a program storage unit 14a of the storage unit 14.

The object position area detection unit 11 detects, from an inputted image, a position area of an object included in the image, on the basis of a first class definition in which a plurality of classes are defined in advance. Here, the "inputted image" can be considered as, for example, an image inputted from the imaging unit 2 to the object detection device 3, but is not limited to this image, and can also be considered as an image inputted from an external terminal device or server to the object detection device 3 via a communication line.

The object position area detection unit 11 is configured with, for example, a graphics processing unit (GPU). The GPU is an arithmetic device (processor) specialized for real-time image processing. The object position area detection unit 11 including the GPU makes it possible to construct a neural network capable of machine learning in the GPU, such as a convolutional neural network (CNN), and to cause this neural network to function as the object position area detection unit 11.

In the present embodiment, for example, 80 classes are defined as the first class definition. The 80 classes include, for example, classes such as "Person", "Bicycle", "Car", "Motorcycle", "Airplane", "Bus", "Train", "Truck", "Boat", "Traffic light", and the like. For the object position area detection unit 11, learning is performed in advance (a parameter (weight) of each node constituting the CNN is set in advance) to detect, from an input image, a position area of an object possibly belonging to a class defined by the first class definition. This allows the object position area detection unit 11 to detect, when an image is actually inputted from the outside, a position area of an object that seems to be "Person", an object that seems to be "bicycle", or the like from the inputted image, on the basis of the first class definition.

The class identification unit 12 identifies which of a plurality of classes an object included in an inputted image belongs to, on the basis of the second class definition in which a plurality of classes are defined in advance. Similarly to the object position area detection unit 11, such a class identification unit 12 is configured with a GPU. This makes it possible to construct a neural network capable of machine learning in the GPU, such as the CNN, and cause the neural network to function as the class identification unit 12.

In the present embodiment, for example, five classes are defined as the second class definition. The five classes are, for example, "Person", "Car", "Bus", "Truck", and "Others". That is, the number of classes defined by the second class definition is smaller than the number of classes defined by the first class definition.

Here, among the plurality of classes defined by the second class definition, "Person", "Car", "Bus", and "Truck" are the same as the classes defined by the first class definition. In addition, here, "Others" defined by the second class definition refers to a class in which, among a plurality of classes defined by the first class definition, classes other than "Person", "Car", "Bus", and "Truck" are collected. Thus, it can be said that the plurality of classes defined by the second class definition include a class (in the above example, "Person", "Car", "Bus", and "Truck") same as some of the plurality of classes defined by the first class definition, and a class (in the above example, "Others") in which two or more other classes in the plurality of classes defined by the first class definition are collected.

In addition, the plurality of classes ("Person", "Car", "Bus", "Truck", and "Others") defined by the second class definition are formed by collecting some ("Person", "Car", "Bus", "Truck", and other two or more classes) of 80 classes defined by the first class definition. That is, the plurality of classes defined by the second class definition are a set (subset) of some of the plurality of classes defined by the first class definition.

For the class identification unit 12, learning is performed in advance (a parameter (weight) of each node constituting the CNN is set in advance) to identify a class to which an object included in an input image belongs, on the basis of the second class definition. This allows the class identification unit 12 to identify, when an image is actually inputted from the outside, which one of the classes defined by the second class definition an object included in the input image (including an object whose position area has already been detected by the object position area detection unit 11) belongs to, on the basis of the second class definition.

In the present embodiment, since the class identification unit 12 is configured with the CNN, not only an identification result of the class to which the object belongs but also a score indicating likelihood (certainty) of the class is outputted from the class identification unit 12. For example, the class identification unit 12 outputs information (class information with a score) indicating that the certainty that the object is "Person" is 0.8 and the certainty that the object is "Car" is 0.2.

The object detection result output unit 13 outputs an object detection result on the basis of the detection result of the object position area detection unit 11 and the identification result of the class identification unit 12. For example, for an object at a position area detected by the object position area detection unit 11, when the class identification unit 12 outputs information indicating that the certainty that the object is "Person" is 0.8 and the certainty that the object is "Car" is 0.2, the object detection result output unit 13 outputs, as the object detection result, information on a position area and an identification result indicating that an object at the position area is "Person" (not "Car"). Such an object detection result output unit 13 is configured with, for example, the same CPU as or a separate CPU from the control unit 19.

The storage unit 14 is a memory that stores various types of information, and is configured with, for example, a hard disk, but may be configured to further include a random access memory (RAM), a read only memory (ROM), and the like. This storage unit 14 includes the program storage unit 14a, an input image storage unit 14b, a class definition storage unit 14c, and a parameter storage unit 14d.

The program storage unit 14a stores an operation program for operating each unit of the object detection device 3. The input image storage unit 14b temporarily stores data of an image acquired by the imaging unit 2 and inputted to the object detection device 3, for example. Note that, when image data is inputted from an external terminal device or server to the object detection device 3, the input image storage unit 14b may temporarily store the image data. In addition, a configuration may be adopted in which the image inputted to the object detection device 3 is directly inputted to the object position area detection unit 11 without being stored in the input image storage unit 14b.

The class definition storage unit 14c stores the first class definition (for example, 20 classes) and the second class definition (for example, 5 classes) described above. Note that the first class definition and the second class definition stored in the class definition storage unit 14c can be changed (updated) by the input unit 15 described later. The object position area detection unit 11 can detect a position area of an object on the basis of the first class definition by accessing the class definition storage unit 14c. In addition, the class identification unit 12 can identify a class of an object on the basis of the second class definition by accessing the class definition storage unit 14c.

The parameter storage unit 14d stores a parameter (weight) of each node of the CNN constituting the object position area detection unit 11 and the class identification unit 12. The parameter is updated every learning of the CNN and stored in the parameter storage unit 14d.

The input unit 15 is configured with, for example, a keyboard, a mouse, a touch pad, a touch panel, and the like, and receives various instruction inputs by the user. The display unit 16 is a device that displays various types of information, and is configured with, for example, a liquid crystal display device. The communication unit 17 is an interface for communication with the imaging unit 2 and an external terminal (for example, another terminal device (including a mobile terminal such as a smartphone) and a server). The communication unit 17 is configured to include an antenna, a transmission/reception circuit, a modulation circuit, a demodulation circuit, and the like in addition to an input/output port. The reading unit 18 is a device that reads information recorded on a recording medium R, and is configured with, for example, a disk drive. Note that, in a case where the recording medium R is a portable non-volatile memory, the reading unit 18 also includes a connection port to be inserted with a connection portion of the non-volatile memory.

2. Operation of Object Detection System

Next, an operation of the object detection system 1 of the present embodiment will be described separately for a time of learning and a time of inference (a time of object detection). Note that, in the following description, it is assumed that the above-described 80 classes (for example, "Person", "Bicycle", "Car", "Motorcycle", "Airplane", "Bus", "Train", "Truck", "Boat", "Traffic light", and the like) are defined as the first class definition, while the above-described five classes (for example, "Person", "Car", "Bus", "Truck", and "Others") are defined as the second class definition.

(Operation at Time of Learning)

Figure 2:
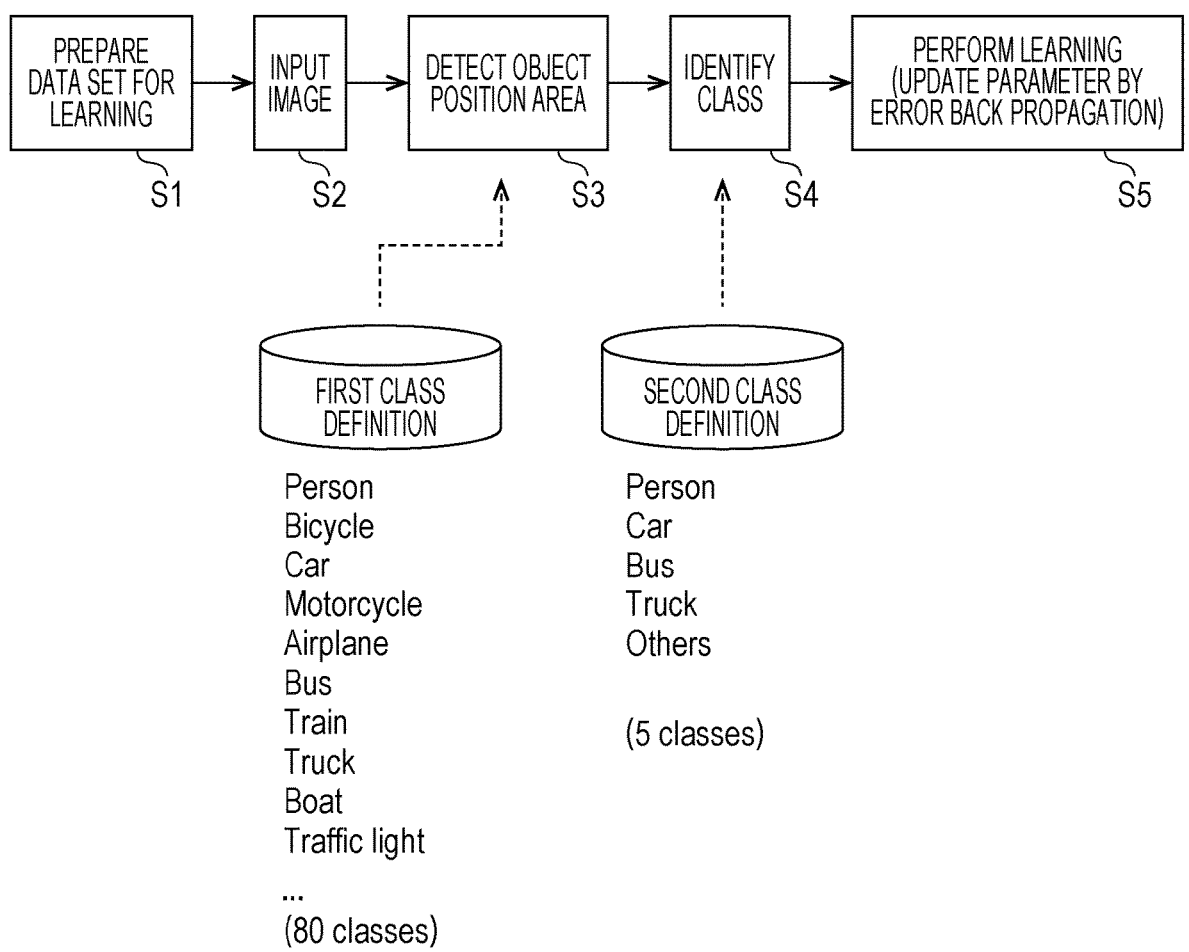
FIG. 2 is an explanatory diagram illustrating a flow of processing at a time of learning in the object detection system.

FIG. 2 is an explanatory diagram illustrating a flow of processing at a time of learning in the object detection system 1. First, a data set for learning is prepared prior to learning (S1). The data set is a set of: data of an image including an object; and a label indicating a correct answer class of the object. Here, a data set including data of images of 80 classes is prepared, but there are two types of definitions of the first class definition and the second class definition as the definition of the correct answer class. Therefore, for example, a correct answer class for an image of "Person" is "Person" in both the first class definition and the second class definition, but a correct answer class for an image of "Bicycle" is "Bicycle" in the first class definition and "Others" in the second class definition. Note that a plurality of data sets may be prepared for each of the 80 classes. For example, a plurality of data sets of different images may be prepared for "Person" constituting one class of the 80 classes.

When an image of the data set for learning is inputted to the object detection device 3 (S2), on the basis of the first class definition, the object position area detection unit 11 detects a position area of an object possibly belonging to any one of the 80 classes from the image by neuro computation in the CNN (S3). Then, the class identification unit 12 identifies which of the five classes defined by the second class definition a class of an object at the position area detected by the object position area detection unit 11 belongs to, by neuro computation in the CNN (S4).

Thereafter, the control unit 19 performs error back propagation method (back propagation) on the basis of information outputted from the class identification unit 12, to update a parameter of each node of the CNN constituting the object position area detection unit 11 and the class identification unit 12 (S5). More specifically, the control unit 19 updates a parameter of each node of the object position area detection unit 11 so as to detect a position area for an object of a correct answer class defined by the first class definition, and updates a parameter of each node of the class identification unit 12 so as to output a correct answer class defined by the second class definition as an identification result of a class of an object at the position area detected by the object position area detection unit 11.

(Operation at Time of Inference)

Figure 3:
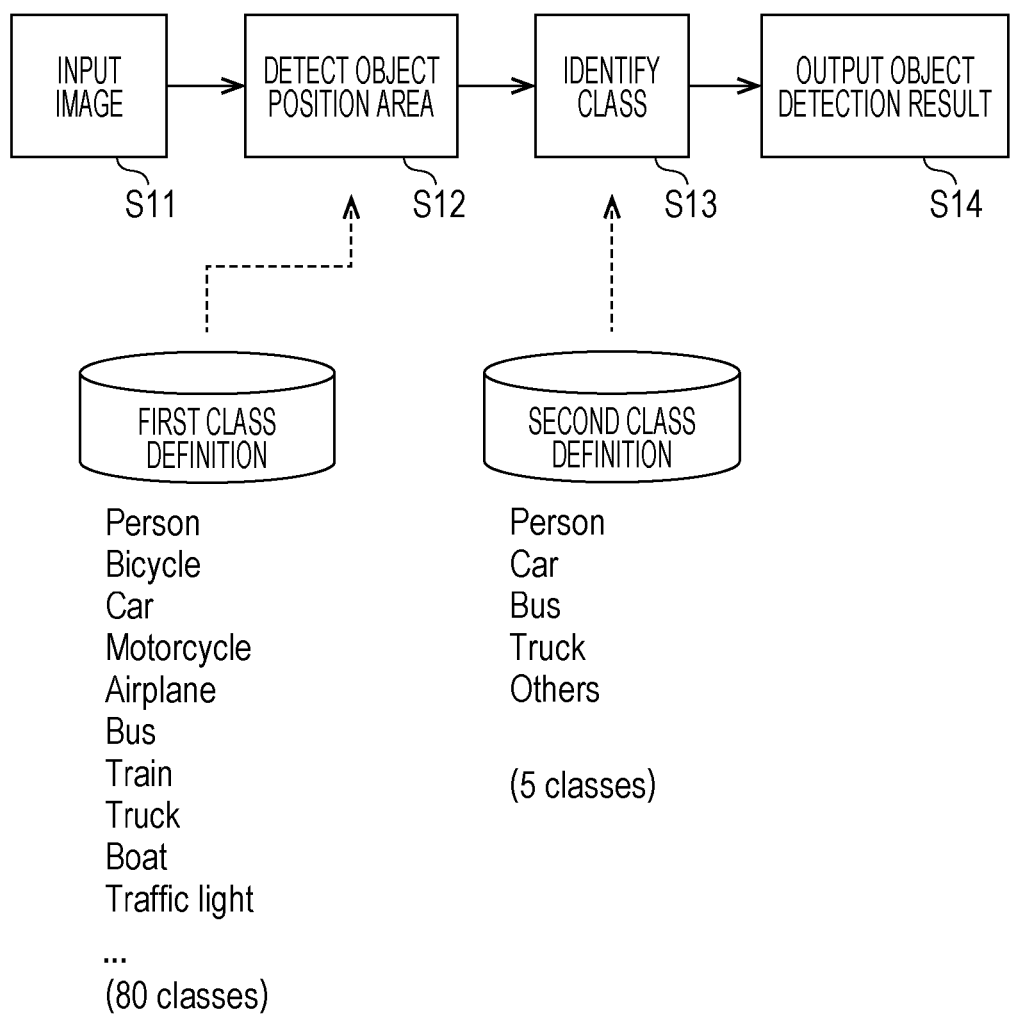
FIG. 3 is an explanatory diagram illustrating an example of processing at a time of inference in the object detection system.

FIG. 3 is an explanatory diagram illustrating an example of processing at a time of inference in the object detection system 1. For example, when the image acquired by the imaging unit 2 is inputted to the object detection device 3 (S11), from the image, on the basis of the first class definition, the object position area detection unit 11 detects a position area of an object possibly belonging to any one of the 80 classes by the neuro computation in the CNN (S12; object position area detection step).

Next, the class identification unit 12 identifies, by neuro computation in the CNN, which of the five classes (for example, "Person", "Car", "Bus", "Truck", and "Others") defined by the second class definition a class of an object at the position area detected by the object position area detection unit 11 belongs to, and outputs information on the identified class with a score (S13; class identification step).

The object detection result output unit 13 selects a class of an object having the highest score from the class information outputted from the class identification unit 12, and outputs the selected class and information on the position area detected by the object position area detection unit 11, as an object detection result (S14; object detection result output step). The object detection result (position area information, class information) outputted from the object detection result output unit 13 may be displayed on the display unit 16, for example, or may be transmitted to the outside via the communication unit 17.

3. Effects

In the present embodiment, the object position area detection unit 11 detects a position area of an object included in an input image, on the basis of the first class definition, and the class identification unit 12 identifies a class of the object on the basis of the second class definition. In this configuration, the number of classes (for example, five) defined by the second class definition is less than the number of classes (for example, 80) defined by the first class definition. In addition, the plurality of classes defined by the second class definition are formed by collecting some of the plurality of classes defined by the first class definition.

Since the first class definition and the second class definition are defined as described above, the detection of the position area by the object position area detection unit 11 can be performed in a large number of classes (80 classes in the above example) on the basis of the first class definition. This makes it possible to detect the presence of various objects from an image, and to improve generalization performance to improve object detection performance.

In addition, on the basis of the second class definition, the class identification by the class identification unit 12 can be performed in a small number of specific classes (five classes of "Person", "Car", "Bus", "Truck", and "Others" in the above example) among the plurality of classes defined by the first class definition. Therefore, it is not necessary to allocate the identification performance of the class identification unit 12 for identification of a class other than the specific class. As a result, the identification performance for the specific class can be improved. Conversely, in a case where the identification performance of the class identification unit 12 is constant, it is possible to reduce a scale of the class identification unit 12 (for example, a processing capability of the GPU) (as compared with a configuration in which a large number of classes of objects can be identified).

Further, the plurality of classes defined by the second class definition include: a class (in the above example, four classes of "Person", "Car", "Bus", and "Truck") same as some of the plurality of classes defined in the first class definition; and a class (for example, "Others") in which two or more other classes in the plurality of classes defined by the first class definition are collected. In this case, the class identified by the class identification unit 12 on the basis of the second class definition can be limited to the same class as some of the plurality of classes defined by the first class definition, and the identification performance of the class can be improved. Further, since two or more other classes in the plurality of classes defined by the first class definition are identified as one class, distinguishing each other (for example, distinguishing between "Bicycle" and "Motorcycle") can be made unnecessary, and learning for distinguishing classes from each other can also be made unnecessary.

Further, the object position area detection unit 11 is configured with a neural network. In this case, by causing the object position area detection unit 11 to perform machine learning, a position area of an object can be detected by neuro computation on the basis of an input image. In addition, by updating a parameter (weight of each node) of the neural network with machine learning, it is possible to improve the detection accuracy of the position area, that is, the detection accuracy of the presence or absence of the object.

Further, the class identification unit 12 is configured with a neural network. In this case, by causing the class identification unit 12 to perform machine learning, the class of the object can be identified by neuro computation. In addition, it is possible to improve class identification accuracy by updating a parameter (weight of each node) of the neural network by machine learning.

Further, in the present embodiment, the class identification unit 12 identifies the class after detection of the position area by the object position area detection unit 11 (see FIG. 3). In this case, since the class identification unit 12 can identify the class of the object whose position area has been detected by the object position area detection unit 11 (since the class can be identified only for the object that seems to be the object), the object detection performance can be further improved.

4. Modified Example

Figure 4:
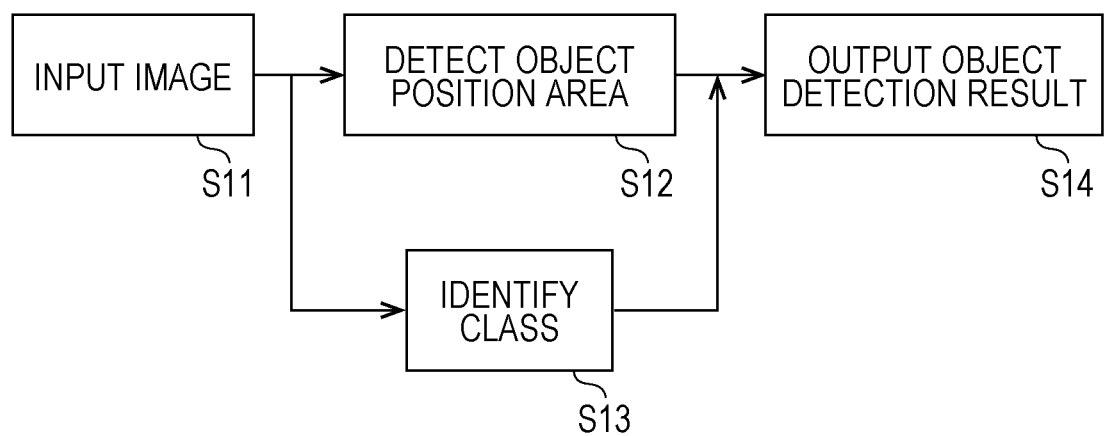
FIG. 4 is an explanatory diagram illustrating another example of processing at a time of inference in the object detection system.

FIG. 4 is an explanatory diagram illustrating another example of processing at a time of inference in the object detection system 1. FIG. 4 is similar to FIG. 3 except that the class identification unit 12 identifies a class of an object included in an image simultaneously with detection of a position area by the object position area detection unit 11. In this configuration, an object for which the class identification unit 12 identifies the class is not an object existing in a specific position area in the image but an object existing somewhere in the input image. Even in this case, by causing the class identification unit 12 to perform machine learning in advance, it is possible to identify a class of an object (an object whose position area is not specified) located somewhere in the input image at the time of inference.

In this way, by simultaneously performing the detection of the position area by the object position area detection unit 11 and the identification of the class of the object by the class identification unit 12, the object detection (output of a detection result) can be performed more quickly than the case where these processes are continuously performed as illustrated in FIG. 3.

5. Program and Recording Medium

The object detection device 3 of the present embodiment described above can be configured with, for example, a computer (PC) in which a predetermined program (application software) is installed. By reading and executing the program by the computer (for example, the control unit 19 as a CPU), each unit of the object detection device 3 can be operated to execute each process (each step) described above. Such a program is acquired by being downloaded from the outside via a network, for example, and stored in the program storage unit 14a. Further, a form may be adopted in which the program is recorded on the computer-readable recording medium R such as a compact disk-read only memory (CD-ROM), for example, and the program is read from the recording medium R by the computer and stored in the program storage unit 14a.

6. Others

The object detection device, the object detection system, the object detection method, the program, and the recording medium described in each embodiment described above may be expressed as follows.

1. An object detection device including:
an object position area detection unit that detects, from an inputted image, a position area of an object included in the image, based on a first class definition in which a plurality of classes are defined in advance;
a class identification unit that identifies which of the plurality of classes the object belongs to, based on a second class definition in which a plurality of classes are defined in advance; and
an object detection result output unit that outputs a detection result of the object, based on a detection result of the object position area detection unit and an identification result of the class identification unit, in which
a number of classes defined in the second class definition is smaller than a number of classes defined in the first class definition, and
a plurality of classes defined by the second class definition are formed by collecting some of a plurality of classes defined by the first class definition.

2. The object detection device according to 1 described above, in which
a plurality of classes defined by the second class definition include:
a class same as some of a plurality of classes defined by the first class definition; and
a class in which two or more other classes in a plurality of classes defined by the first class definition are collected.

3. The object detection device according to 1 or 2 described above, in which the object position area detection unit includes a neural network.

4. The object detection device according to any one of 1 to 3 described above, in which the class identification unit includes a neural network.

5. The object detection device according to any one of 1 to 4 described above, in which the class identification unit identifies the class after detection of the position area by the object position area detection unit.

6. The object detection device according to any one of 1 to 4 described above, in which the class identification unit identifies the class simultaneously with detection of the position area by the object position area detection unit.

7. An object detection system including:
the object detection device according to any one of 1 to 6 described above; and
an imaging unit that acquires the image inputted to the object detection device.

8. An object detection method including:
an object position area detection step of detecting, from an inputted image, a position area of an object included in the image, based on a first class definition in which a plurality of classes are defined in advance;
a class identification step of identifying which of the plurality of classes the object belongs to, based on a second class definition in which a plurality of classes are defined in advance; and
an object detection result output step of outputting a detection result of the object, based on a detection result of the object position area detection step and an identification result of the class identification step, in which
a number of classes defined in the second class definition is smaller than a number of classes defined in the first class definition, and
each class defined by the first class definition is included in any one of individual classes defined by the second class definition.

9. The object detection method according to 8 described above, in which
a plurality of classes defined by the second class definition include:
a class same as some of a plurality of classes defined by the first class definition; and
a class in which two or more other classes in a plurality of classes defined by the first class definition are collected.

10. The object detection method according to 8 or 9 described above, in which, in the object position area detection step, the position area is detected by neuro computation.

11. The object detection method according to any one of 8 to 10 described above, in which, in the class identification step, the class is identified by neuro computation.

12. The object detection method according to any one of 8 to 11 described above, in which the class identification step is performed after the object position area detection step.

13. The object detection method according to any one of 8 to 11 described above, in which the class identification step is performed simultaneously with the object position area detection step.

14. A program for causing a computer to execute the object detection method according to any one of 8 to 13 described above.

15. A computer-readable recording medium on which the program according to 14 described above is recorded.

Although the embodiment of the present invention has been described above, the scope of the present invention is not limited thereto, and expansion or modification can be made for implementation without departing from the gist of the invention.

INDUSTRIAL APPLICABILITY

The present invention can be used in a system that detects, from an inputted image, an object included in the image.

REFERENCE SIGNS LIST

1 Object detection system
2 Imaging unit
3 Object detection device
11 Object position area detection unit
12 Class identification unit
13 Object detection result output unit

The invention claimed is:

1. An object detection device comprising:
an object position area detector that detects, from an inputted image, a position area of an object included in the image, based on a first class definition in which a plurality of classes are defined in advance;
a class identifier that identifies which of the plurality of classes the object belongs to, based on a second class definition in which a plurality of classes are defined in advance; and
a hardware processor that outputs a detection result of the object, based on a detection result of the object position area detector and an identification result of the class identifier, wherein
a number of classes defined in the second class definition is smaller than a number of classes defined in the first class definition,
a plurality of classes defined by the second class definition are formed by collecting some of a plurality of classes defined by the first class definition, and
a plurality of classes defined by the second class definition include:
a class same as some of a plurality of classes defined by the first class definition; and
a class in which two or more other classes in a plurality of classes defined by the first class definition are collected.

2. The object detection device according to claim 1, wherein the object position area detector includes a neural network.

3. The object detection device according to claim 1, wherein the class identifier includes a neural network.

4. The object detection device according to claim 1, wherein the class identifier identifies the class after detection of the position area by the object position area detector.

5. The object detection device according to claim 1, wherein the class identifier identifies the class simultaneously with detection of the position area by the object position area detector.

6. An object detection system comprising:
the object detection device according to claim 1; and
an imager that acquires the image inputted to the object detection device.

7. An object detection method comprising:
detecting, from an inputted image, a position area of an object included in the image, based on a first class definition in which a plurality of classes are defined in advance;
identifying which of the plurality of classes the object belongs to, based on a second class definition in which a plurality of classes are defined in advance; and
outputting a detection result of the object, based on a detection result of the object position area detector and an identification result of the class identifier, wherein
a number of classes defined in the second class definition is smaller than a number of classes defined in the first class definition,
a plurality of classes defined by the second class definition are formed by collecting some of a plurality of classes defined by the first class definition, and
a plurality of classes defined by the second class definition include:
a class same as some of a plurality of classes defined by the first class definition; and
a class in which two or more other classes in a plurality of classes defined by the first class definition are collected.

8. The object detection method according to claim 7, wherein, in the detecting, the position area is detected by neuro computation.

9. The object detection method according to claim 7, wherein, in the identifying, the class is identified by neuro computation.

10. The object detection method according to claim 7, wherein the identifying is performed after the detecting.

11. The object detection method according to claim 7, wherein the identifying is performed simultaneously with the detecting.

12. A non-transitory recording medium storing a computer readable program for causing a computer to execute the object detection method according to claim 7.

13. A computer-readable recording medium on which the program according to claim 12 is recorded.

* * * * *